United States Patent [11] 3,609,185

| [72] | Inventor | Bertram Yeomans |
| | | Hessle; Alan Frederick Parkes, |
| | | Holderness Hull, both of England |
| [21] | Appl. No. | 835,778 |
| [22] | Filed | June 23, 1969 |
| [45] | Patented | Sept. 28, 1971 |
| [73] | Assignee | B.P. Chemicals (U.K.) Limited, |
| | | London, England |
| [32] | Priority | June 29, 1968, Jan. 6, 1969 |
| [33] | | Great Britain |
| [31] | | 3/222/68 and 778/69 |

[54] PRODUCTION OF ORGANIC ACIDS
12 Claims, No Drawings

| [52] | U.S. Cl. | 260/533 A, 260/514 R, 260/537 R, 260/683.9 |
| [51] | Int. Cl. | C07c 55/02 |
| [50] | Field of Search | 260/533 A, 537 R |

[56] References Cited
UNITED STATES PATENTS

| 3,210,404 | 10/1965 | Durr et al. | 260/537 |
| 3,278,431 | 10/1966 | Morway et al. | 260/537 |

FOREIGN PATENTS

| 908,497 | 10/1962 | Great Britain | 260/533 |

*Primary Examiner*—James A. Patten
*Assistant Examiner*—Richard D. Kelly
*Attorney*—Jacobs & Jacobs

ABSTRACT: Di-neocarboxylic acids are produced by reaction of an $\alpha,\alpha^1$ dialkyl substituted monoolefin in which the alkyl groups are separated by at least three carbon atoms, or an unconjugated $\alpha,\alpha^1$ dialkyl substituted diolefin with formic acid in the presence of concentrated sulfuric acid or with carbon monoxide in the presence of a mineral or Lewis acid.

PRODUCTION OF ORGANIC ACIDS

The present invention relates to the production of dineocarboxylic acids.

It is known to prepare mononeocarboxylic acids by reaction of an olefin with formic acid in the presence of concentrated sulfuric acid or with carbon monoxide in the presence of an acidic substance, for example boron trifluoride. It has now been discovered that when olefins of a particular configuration are used in these reactions dineoscids are obtained. These may be used in the production of polymers, plasticizers or synthetic lubricants for example.

Accordingly the present invention is a process for the production of a dineocarboxylic acid by reacting an olefin with formic acid in the presence of concentrated sulfuric acid or with carbon monoxide in the presence of a mineral or Lewis acid, wherein the olefin is an $\alpha$, $\alpha^1$ dialkyl substituted monoolefin in which the isoalkyl carbon atoms are separated by not less than three carbon atoms or an unconjugated 60, $\alpha^1$ dialkyl substituted diolefin in which the isoalkyl carbon atoms are separated by not less than three carbon atoms and at least one of the double bonds is not in terminal position.

By "neoacid" is meant throughout this specification an aliphatic carboxylic acid where the 60 carbon atoms is attached directly to four further carbon atoms, i.e. the $\alpha$ carbon atoms is a quaternary carbon atom. By "dineoacid" is meant It is preferred that the monoolefin used in accordance with the invention shall not have the double bond in a terminal or subterminal position. It is preferred that the diolefin shall have both double bonds in nonterminal and nonsubterminal positions. The alkyl substituents on the olefins may be any alkyl group particularly those containing one to nine carbon atoms. A preferred olefin is 2, 7 dimethyloctene — 4, and a preferred diolefin is 2,7, dimethyl octadiene, particularly the (1,7), (2,7) and (2,6) isomers, The olefin must of course contain at least nine carbon atoms. It is preferred to use olefins which do not contain more than twenty carbon atoms.

When using formic and sulfuric acids it is preferred to have at least 1 mole of formic acid and at least 1 mole of sulfuric acid per mole of olefin fed to the reactor. The preferred molar ratio of olefin: formic acid: sulfuric acid is in the range 1:1 to 15:2 to 4 but ratios anywhere in the range 1:1 to 3 1 to 10 are suitable. The sulfuric acid should be of strength not less than 90% w.w., preferably not less than 95%w./w. and most preferably between 97% w./w. and 100% w./w. $H_2SO_4$.

When using formic acid, the reaction may be carried out at ambient temperature. Form 0° to 35° C. is a particularly suitable temperature range and the preferred range is 0° to 25° C.

The dineoacid product can be separated by the addition of water to the mixture obtained by the reaction.

After removal of the dineoacids, the sulfuric acid may be recycled to the reaction, after refortification if necessary.

The olefin may be added to the reaction mixture in solution, suitably at a concentration of 1% to 50% w./w. It is preferred that the solvent should not contain hydrogen atoms. Aliphatic chlorocarbons such as carbon tetrachloride or preferably perchloroethylene may be used, or any chlorinated hydrocarbon of formula $C_nCL_{2n+2}$ where $n$ is 1 to 4 or of formula $C_nCl_{2n}$ when $n$ is 2 to 4.

When using carbon monoxide the reaction may again be carried out in the presence of concentrated sulfuric acid, for example or other mineral acids such as phosphoric or hydrofluoric acid. Lewis acids may also be used, such as boron trifluoride and its complexes with water and/or mineral acids, and mixtures of pentafluoroantimonate and hydrofluoric acid. A suitable catalyst has a composition in the range 1-mol water: 1 to 10-mol phosphoric acid: 1 to 10-mol boron trifluoride. It is preferred to use about 1 volume of olefin to 0.5 to 6 volumes of catacatalyst mol preferably 1 volume olefin to 1 to 2 volumes of catalyst.

The reaction with carbon monoxide will take place at ambient temperature, and temperatures in the range 0° to 100° C. are suitable. The preferred range is 10° to 60° C. and a temperature in the range 20° to 40° C. is particularly preferred. The reaction is suitably carried out at a pressure in the range 1 to 200 atmospheres, preferably 10 to 100 atmospheres, most preferably 20 to 60 atmospheres.

This invention is further illustrated in the following examples.

EXAMPLE 1

Formic acid (0.6 m. of 99% w./w.) and 2:7-dimethyl octene-4 (0.3 m.) dissolved in cyclohexane (0.3 m.) were added under stirring to a round bottom flask (1,1.) which contained sulfuric acid (3 m. of 98.5% w./w.) so that a slight excess of formic acid to olefin was always present in the reactor. The additions were carried out over 85 minutes at 13° C. The reaction product was then diluted with water. The dineoacid was separated from the catalyst by filtration and by partition of the filtrate with cyclohexane. The dineoacid was dissolved in aqueous sodium hydroxide and was regenerated with excess mineral acid. The total yield of crude neoacid corresponded to an olefin conversion of 54%. The recrystallization of the crude neoacid from aqueous ethanol gave a first crop dibasic acid yield of 31.7% (0.0952 m.). This acid was found to be 2:2:a :7-tetramethyl suberic acid (m.p.t. 183°–185° C. assay 483 mg. KOH equiv./g.) and this identification was confirmed by elements assay and by infrared, nuclear magnetic resonance and mass spectroscopic analyses.

The cyclohexane solution of the neutral reaction product was concentrated free of solvent giving a residue (21.4 g.) which was identified as 2:7-dimethyl octane by infrared spectroscopic analyses.

EXAMPLE 2

Formic acid (0.45 m.) was added to sulfuric acid (1.8 m. of 98.5% w./w.) under stirring in a round bottom flask (0.51.) at ca. −15° C. Then 2:7-dimethyl octene-4 (0.3 m.) dissolved in perchloroethylene (0.3 m.) was added to the stirred mixture over 75 minutes at 0° to 14° C. and the products were isolated as described in example 1. The total yield of crude neoacid corresponds to an olefin conversion of 41.1%. Recrystallization of the crude product gave a first crop yield of 29% (58% efficiency on olefin) of 2:2:7:7-tetramethyl suberic acid.

EXAMPLE 3

Production of tetramethylsuberic acid from a 2,7-dimethyl octene

Formic acid (0.45 m. of 99% w./w.) and a mixture of 2.7-dimethyl octene isomers containing 75% of 2.7-dimethyl octene-2 (0.3 m. dissolved in perchloroethylene (0.3 m.) were added under stirring to a round bottom flask (1,1) which contained sulfuric acid (0.9 m. of 98.5% w./w.) so that a slight excess of formic acid to olefin was always present in the reactor. The additions were carried out over 3.5 h. at 5° to 12° C. A 37% yield of crude neoacids was obtained from which tetramethylsuberic acid (11%-yield) was isolated.

When olefin feed consisting of 2.7-dimethyl octene-4 only was used under the conditions employed above 48%-yield of crude neoacids was obtained from which tetramethylsuberic acid (29%-yield) was isolated. This improved yield of the dineoacid is attributed to a reduced conversion to monoalicyclic neoacids, and illustrates the preference for an olefin which does not have a subterminal double bond.

EXAMPLE 4

Production of dineoacids from olefins with different separations between the $\alpha,\alpha^1$-dimethyl groups The experimental procedure employed was as described in example 1 above, except that more forcing conditions were employed by increasing the amount of sulfuric acid catalyst used. The results are given in table 1.

TABLE 1

| Run No. | Olefin used | No. of carbons separating α, α¹ dimethyl groups | Molar ratio used | | | Percent yield of— | |
|---|---|---|---|---|---|---|---|
| | | | $H_2SO_4$ | HCOOH | Olefin | Crude neo-acids | Di-neo-acids |
| 1 | 2.7-dimethyl octene-4 | 4 | 6 | 1.5 | 1 | 49 | 31 |
| 2 | 2.6-dimethyl heptene-3 | 3 | 6 | 1.5 | 1 | 60 | 11 |
| 3 | 2.5-dimethyl hexene-3 | 2 | 6 | 1.5 | 1 | 66 | 0 |
| 4 | 2.4-dimethyl pentene-3 | 1 | 6 | 1.5 | 1 | 59 | 0 |
| 5 | 3.4-dimethyl hexene-2 | 0 | 6 | 2 | 1 | 87 | 0 |

The above results indicate that the limiting separation between α,α¹-dimethyl groups consistent with production of dineoacids by these techniques is not less than three carbon atoms.

EXAMPLE 5

The effect on neoacid productions of variation of the α,α¹ dialkyl groups separated by two carbon atoms The experimental procedure employed was as described in example 2 above.

The results are given in table 2.

TABLE 2

| Run No. | Olefin used | No. of carbons separating α, α¹ dimethyl groups | Molar ratio used | | | Percent yield of— | |
|---|---|---|---|---|---|---|---|
| | | | $H_2SO_4$ | HCOOH | Olefin | Crude neo-acids | Di-neo-acids |
| 1 | 2.5-dimethyl hexene-3 | 2 | 6 | 1.5 | 1 | 66 | 0 |
| 2 | 2.5-diethyl hexene-3 | 2 | 6 | 1.5 | 1 | 82 | 0 |

The replacement of α,α¹-dimethyl groups by diethyl groups markedly improved the yield of mononeoacids but did not give dineoacids.

Example 6

Production of dineoacids from aliphatic diene feeds with separation of the α,α¹-dimethyl groups greater than four carbon atoms The experimental procedure of example 2 was employed. The results are given in table 3.

TABLE 3

| Olefin used | No. of carbons separating α, α¹ dimethyl groups | Molar ratio used | | | Percent yield of— | | |
|---|---|---|---|---|---|---|---|
| | | $H_2SO_4$ | HCOOH | Olefin | Crude neo-acids | Mono-neo-acids | Di-acids |
| 2.11-dimethyl dodeca-4.8-diene | 8 | 6 | 1.5 | Mol. equiv. | 62 | 30 | ¹ 32 |

¹ Pure 2.2.11.11.-tetramethyl dodecandioic acid (m. 90°—91.5° C.) was isolated in 11% yield from the crude reaction product.

There was a large competitive consumption of one double bond in cyclisation reactions to give 1-carboxy-1,2-diisobutyl cyclohexane.

Example 7

Production of dineoacids from alkyl:alicyclic substituted dienes

The experimental procedure of example 2 was employed. The results are given in table 4.

Pure 1-carboxy-1-(4-carboxy-4carboxy-4-methyl pentyl) cyclohexane (m.p. 183° 4° C.) was isolated in 24%-yield from the crude neoacid product. The reaction is represented as follows

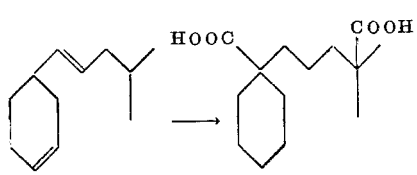

The mononeoacid product largely comprised an isomeric mixture of 1-carboxy-2.2-dimethyl bicyclodecanes which were formed by competitive consumption of one double bond in cyclisation reactions.

Example 8

2.7-Dimethyloctene-4 (1 mol) dissolved in tetrachloroethylene (1 mol) was added (6h. at 15° C. to 31° C.) to an autoclave (3,1) which contained 99% w./w. sulfuric acid (6 m.) under a carbon monoxide pressure of 440 p.s.i.g. under stirring. When the olefin addition was complete the autoclave contents were stirred for a further 1 h. and were then mixed with ice (600 g.). The precipitated 2.2.7.7-tetramethyl-suberic acid was separated by filtration and was washed with tetrachloroethylene and distilled water. The isolated tetramethylsuberic acid amounted to 30.3%-yield on the olefin fed and a further 3.7%-yield was present in the mother liquor acids dissolved in the tetrachloroethylene. The mother liquor neoacids amounted to 10.7%-yield on the olefin fed and mainly consisted of a mixture of neoundercyclic acids.

TABLE 4

| Olefin used | No. of carbons separating α, α¹ dimethyl groups | Molar ratio used | | | Percent yield of— | | |
|---|---|---|---|---|---|---|---|
| | | $H_2SO_4$ | HCOOH | Olefin | Crude neo-acids | Mono-neo-acids | Di-acids |
| 1-cyclohex-3-enyl-4-methyl pentene-1 | 3 | 6 | 1.5 | Mol. equiv. | 71 | 40 | 24 |

Example 9

2.7-Dimethyloctene-4 (2 mol) dissolved in tetrachloroethylene (2 mol) was added (4 h. at 9° to 31° C.) as above to 99% w./w. sulfuric acid (6 mol) under a carbon monoxide pressure of 425 p.s.i.g. under stirring. A 21%-yield of isolated tetramethylsuberic acid was obtained together with a 21%-yield of mother liquor neoacids.

Example 10

2.7-Dimethyloctene-4 (1 t mol) dissolved in tetrachloroethylene (1 mol) was added, under stirring, over 2.25 h. at 10 : to 17° C. under a carbon monoxide pressure of 1,025 p.s.i.g. to an autoclave (3,1) which contained an equimolar mixture of $BF_3:H_3PO_4:H_2O$ (836 ml.). When the olefin addition was complete, the autoclave contents were withdrawn and chemically separated. A neoacid product (01.t mol) was isolated and this mainly consisted of 2.2.7-trimethyloctanoic acid.

The 2.2.7-trimethyloctanoic acid (0.015 mol) was mixed with an equimolar mixture of $BF_3:H_3PO_4:H_2O$ (58 g.) and the mixture was allowed to stand for 10 days at ambient temperatures. The mixture was then mixed with water (50 g.) and the precipitated 2.2.7.7-tetramethylsuberic acid (0.00011 mol., m.p. 185° C.) was isolated by filtration.

We claim:

1. A process for the production of a dineocarboxylic acid by reacting an olefin with formic acid in the presence of concentrated sulfuric acid or with carbon monoxide in the presence of a mineral or Lewis acid, wherein the olefin is an bis($\alpha,\alpha$1-dialkyl substituted mono-olefin in which the isoalkyl carbon atoms are separated by not less than three carbon atoms or an unconjugated bis($\alpha,\alpha$1-dialkyl substituted diolefin in which the isoalkyl carbon atoms are separated by not less than three carbon atoms and at least one of the double bonds is not in a terminal position.

2. A process according to claim 1 wherein the double bond of the olefin, or both double bonds of the diolefin, are not in a terminal or subterminal position.

3. A process according to claim 1 wherein the olefin contains not more than 20 atoms.

4. A process according to claim 3 wherein the alkyl substituents on the olefin contain one to nine carbon atoms.

5. A process according to claim 1 wherein the olefin is 2,7 dimethyl octene-4.

6. A process according to claim 1 wherein the olefin is reacted with formic acid in the presence of concentrated sulfuric acid and at least 1 mole of formic acid and at least 1 mole of sulfuric acid is used per mole of olefin.

7. A process according to claim 6 wherein the molar ratio of olefin: formic acid: sulfuric acid is in the range 1: 1 to 3:1 to 10.

8. A process according to claim 1 wherein an olefin is reacted with carbon monoxide in the presence of a catalyst selected from the group consisting of concentrated sulfuric acid, phosphoric acid, hydrofluoric acid, boron trifluoride and its complexes with water and/or mineral acid, and a mixture of pentafluoroantimonate and hydrofluoric acid.

9. A process according to claim 1 wherein the reaction with carbon monoxide is carried out at a pressure in the range 1 to 200 atmospheres.

10. A process according to claim 1 wherein an olefin is reacted with carbon monoxide and 1 volume of olefin to 0.5 to 6 volumes of catalyst are used.

11. A process for producing 2, 2, 7, 7, tetramethyl suberic acid by reacting 2,7-dimethyl octene-4 with formic acid in the presence of concentrated sulfuric acid at a temperature in the range 0° to 35° C. wherein the ratio of olefin formic acid sulfuric acid lies in the range 1: 1: 1 to 1:3:10.

12. A process for producing 2, 2, 7, 7 tetramethylsuberic acid by reacting 2, 7-dimethyl octene-4 with carbon monoxide in the presence of concentrated sulfuric acid at a temperature in the range 10° to 60° C. and a pressure in the range 1 to 200 atmospheres wherein 0.5 to 6 volumes of catalyst are used per volume of olefin.

PO-1050 (5/69)

UNITED STATES PATENT OFFICE
CERTIFICATE OF CORRECTION

Patent No. 3,609,185      Dated September 28, 1971

Inventor(s) Bertram Yeomans et al.

It is certified that error appears in the above-identified patent and that said Letters Patent are hereby corrected as shown below:

In the heading, under Priority, change "3/222/68" to --31,222/68--.

In column 1, lines 18 and 23, change "60" to --α--.

In column 1, line 25, after "is meant" insert --a compound containing two neo-acid groups.--

In column 1, line 42, change 3 1 to --3:1--.

In claim 1, line 1, change "dineocarboxylic" to --di-neo-carboxy lines 4 and 5, change "an bis(α,α1-dialkyl" to --a bis(α,α'- dialkyl)--;

line 7, change "bis(α,α1-dialkyl" to --bis(α,α'- dialkyl)--;

line 7, change "diolefin" to -- di-olefin--.

In claim 2, line 2, change "diolefin" to --di-olefin--.

Column 5, line 11, "(1 t mol)" should read -- (1 mol) --.

Signed and sealed this 9th day of May 1972.

(SEAL)
Attest:

EDWARD M. FLETCHER, JR.       ROBERT GOTTSCHALK
Attesting Officer      Commissioner of Patents